March 19, 1929. E. P. RENAUX 1,705,836

DUPLEX BRAKE MECHANISM

Filed April 15, 1926

INVENTOR
EUGENE P. RENAUX
BY
*M. W. McConkey*
ATTORNEY

Patented Mar. 19, 1929.

1,705,836

UNITED STATES PATENT OFFICE.

EUGENE PROSPER RENAUX, OF PARIS, FRANCE, ASSIGNOR TO BENDIX BRAKE COMPANY, OF CHICAGO, ILLINOIS, A CORPORATION OF ILLINOIS.

DUPLEX BRAKE MECHANISM.

Application filed April 15, 1926, Serial No. 102,135, and in France June 8, 1922.

This invention relates to brakes, and is illustrated as embodied in an internal expanding friction brake suitable for an automobile wheel.

An important object of the invention is to provide a compact brake utilizing a very powerful servo or relay action, by arranging a servo device and a friction device in a novel manner, preferably side by side so that they are engagable with immediately-adjacent zones of the same surface (herein illustrated as the internal surface) of the brake drum or the equivalent. In one desirable arrangement, one of the devices has parts such as rollers having operative engagement with wedge surfaces on the other device so that angular movement of the servo device wedges the friction device against the drum. I prefer to utilize a pair of shoes for each of these devices.

Figure 1:
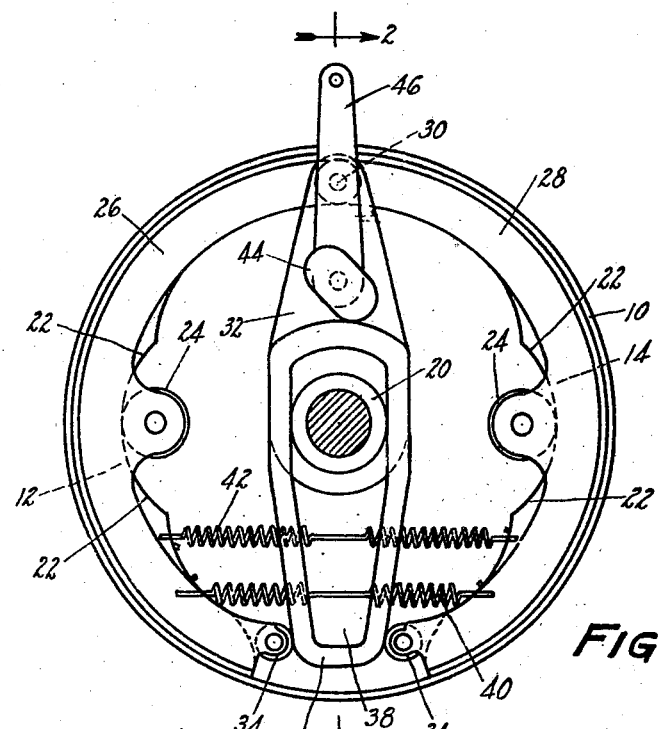
Figure 2:
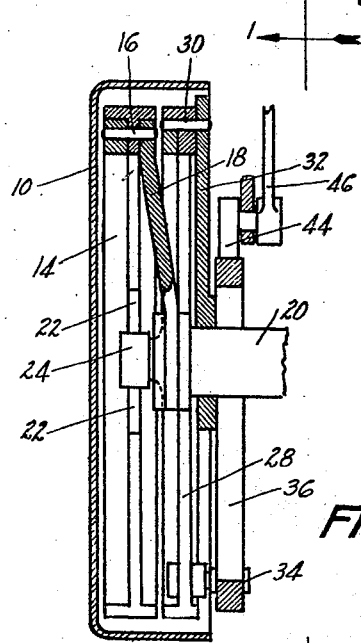

Each of these devices embodies substantial novelty in itself, whether or not it is used in exactly the described arrangement, and various features of novelty relate to the arrangement of the wedge surfaces, and to a novel and simple operating wedge for the servo device. These and various other novel combinations of parts and desirable particular constructions will be apparent from the following description of one illustrative embodiment shown in the accompanying drawing, in which:

Figure 1 is a side elevation of the assembled brake, looking from the open side of the drum; and Figure 2 is a vertical section through the brake on the line 2—2 of Figure 1.

In the particular brake selected for illustration, the friction device and servo device, which jointly form the retarding means of the brake, are arranged side by side inside of a brake drum 10, having the usual peripheral cylindrical braking flange, and are engageable with immediately-adjacent zones of the inner surface of the drum.

The friction means proper preferably includes a pair of shoes 12 and 14, shown anchored by being mounted on a pivot 16 on a stationary support or arm 18 projecting from an axle or the like 20. Each of the arms has a pair of oppositely-directed or tapered pair of wedge surfaces 22, the two pairs being approximately opposite each other. These pairs of wedge surfaces are engaged by parts such as rollers 24 mounted on shoes 26 and 28 forming the servo friction means.

Shoes 26 and 28 are mounted on a pivot 30 on an arm 32 rotatably mounted on the axle or other support 20. At their free ends the shoes 26 and 28 may have rollers 34 projecting laterally, and between which there is forced, to apply the servo shoes to the drum, a double wedge member 36.

Member 36 has an elongated opening 38 embracing a support (such as axle 20) of circular outline, so that it may turn angularly with the servo shoes, and may also move lengthwise or radially of the drum to wedge the shoes apart against the resistance of a return spring 40. When so applied, the servo shoes turn in one direction or the other with the drum, acting as a clutch to cause rollers 24 to force shoes 12 and 14 apart against the resistance of another return spring 42. The rollers 24, and the wedges on which they act, constitute power-multiplying means through which the servo device acts to apply the main friction means of the brake. For convenience of illustration, the two return springs are omitted in Figure 2.

Spring 42 not only moves shoes 12 and 14 away from the drum when the brake is released, but also acts on rollers 24 to swing the servo shoes and support 32 to a central or initial position. Spring 40 moves shoes 26 and 28 away from the drum, and also causes rollers 34 to wedge the member 36 upwardly to its idle position. If desired, an auxiliary spring may be connected directly to member 36 to urge it upwardly.

Member 36 is forced downwardly to apply the brake by a suitable applying device, such as a cam 44 mounted on any suitable stationary part (not shown) and operated by an arm 46. This cam or the like engages a rounded surface on the end of member 36 which, when the brake is applied, is curved about the axis of the drum and of support or axle 20, so that angular movement of member 36 with the servo shoes has no effect on the brake.

It is important to note that, since the surfaces of each pair of wedges 22 slope away from each other, the servo device is effective no matter which direction the drum is turning.

While one illustrative embodiment has been described in detail, it is not my intention to limit the scope of the invention to that particular embodiment of the invention or otherwise than by the terms of the appended claims. Most of the subject-matter claimed in this application is to be regarded as divided from my co-pending application No. 625,072, filed March 14, 1923.

I claim:

1. A brake comprising, in combination, a drum, two friction devices arranged side by side inside of the drum and engageable with adjacent zones of the drum surface, and power-multiplying means operated by one of said friction devices for forcing the other friction device against the drum.

2. A brake comprising, in combination, a drum, two friction devices arranged side by side inside of the drum and engageable with adjacent zones of the drum surface, one of said devices being angularly movable and the other being anchored and having separable parts, and means operated by angular movement of said one device for forcing said parts in opposite directions against the drum.

3. A brake comprising, in combination, a drum, a pair of brake shoes anchored at their ends and engageable with the drum, a servo friction device arranged beside the shoes and engageable with an adjacent zone of the drum surface, and a pair of applying devices operated by movement of the servo device with the drum and respectively acting to force the corresponding shoes against the drum.

4. A brake comprising, in combination, a drum, a pair of brake shoes inside of and engageable with the drum, a servo friction device arranged beside the shoes and engageable with an adjacent zone of the inner drum surface, and means operated by movement of the servo device with the drum for forcing the shoes in opposite directions against the drum.

5. A brake comprising, in combination, a drum, friction means engageable with one zone of the drum surface, a pair of servo shoes movable in opposite directions into engagement with an immediately adjacent zone of the same surface, and means operated by angular movement of the servo shoes for forcing the friction means against the drum.

6. A brake comprising, in combination, a drum, friction means engageable with one zone of the inside surface of the drum, a pair of servo shoes movable apart into engagement with an immediately adjacent zone of the same surface, and means operated by angular movement of the servo shoes for expanding the friction means against the drum.

7. A brake comprising, in combination, a drum, anchored shoes engageable with one zone of the drum surface, a pair of servo shoes movable in opposite directions into engagement with an immediately adjacent zone of the same surface, and means operated by angular movement of the servo shoes for forcing the friction means against the drum.

8. A brake comprising, in combination, a drum, anchored shoes engageable with one zone of the inside surface of the drum, a pair of servo shoes movable apart into engagement with an immediately adjacent zone of the same surface, and means operated by angular movement of the servo shoes for expanding the anchored shoes against the drum.

9. A brake comprising, in combination, a drum, a stationary support and an angularly-movable support adjacent the drum, friction means anchored on the stationary support and movable into engagement with the inside of the drum, servo friction means mounted on the angularly-movable support and movable into engagement with the inside of the drum, and power-multiplying means operated by angular movement of the servo means for forcing the anchored friction means against the drum.

10. A brake comprising, in combination, a drum, a stationary support and angularly-movable support adjacent the drum, friction means anchored on the stationary support and movable into engagement with a zone of the inside surface of the drum, servo friction means mounted on the angularly-movable support and movable into engagement with an immediately-adjacent zone of the inside surface of the drum, and power-multiplying means operated by angular movement of the servo means for forcing the anchored friction means against the drum.

11. A brake comprising, in combination, a drum, friction means engageable with the drum and formed with wedge surfaces, servo means engageable and movable a short distance angularly with the drum, and parts moved by the servo means in engagement with said wedge surfaces to force the friction means against the drum.

12. A brake comprising, in combination, a drum, friction brake shoes engageable with the drum and formed with substantially opposite wedge surfaces, servo means engageable and movable a short distance angularly with the drum, and parts moved by the servo means in engagement with said wedge surfaces to force the shoes in opposite directions against the drum.

13. A brake comprising, in combination, a drum, and brake friction means and servo friction means arranged side by side and engageable with immediately-adjacent zones of the inside drum surface, one of said means having wedge surfaces and the other having parts directly engaging said surfaces so that movement of the servo means will force the brake means against the drum.

14. A brake comprising, in combination, a drum, and brake friction means and servo friction means arranged side by side and engageable with immediately-adjacent zones of the drum surface, one of said means having pairs of oppositely-directed wedge surfaces and the other having parts between the pairs of and engaging said surfaces so that movement of the servo means in either direction will force the brake means against the drum.

15. A brake comprising, in combination, a drum, and brake friction means and servo friction means engageable with the drum, one of said means having pairs of oppositely-directed wedge surfaces and the other having parts between the pairs of and engaging said surfaces so that movement of the servo means in either direction will force the brake means against the drum.

16. A brake comprising, in combination, a drum, and brake friction means and servo friction means engageable with the drum, one of said means having wedge surfaces and the other having parts directly engaging said surfaces so that movement of the servo means will force the brake means against the drum.

17. A brake comprising, in combination, a drum, and brake friction means and servo friction means engageable with the drum, one of said means having pairs of oppositely-directed wedge surfaces and the other having rollers between the pairs of and engaging said surfaces so that movement of the servo means in either direction will force the brake means against the drum.

18. A brake comprising, in combination, a drum, and brake friction means and servo friction means engageable with the drum, one of said means having wedge surfaces and the other having rollers engaging said surfaces so that movement of the servo means will directly force the brake means against the drum.

19. A brake comprising, in combination, a drum, a servo friction device having adjacent ends movable in opposite directions into engagement with the drum, a support of circular outline co-axial with respect to the drum, a wedge part engaging said ends and mounted on the support for axial movement to apply the servo device and for angular movement about the support with the servo device, and friction means operated by angular movement of the servo device.

20. A brake comprising, in combination, a drum, a servo friction device having adjacent ends movable in opposite directions into engagement with the drum, a support of circular outline, a wedge part engaging said ends and having an elongated opening embracing the support to permit axial movement to apply the servo device and angular movement about the support with the servo device, and friction means operated by angular movement of the servo device.

21. A retarding mechanism comprising, in combination, a friction device having adjacent ends, a support of circular outline, a wedge device engaging said ends and having an elongated opening embracing the support and formed with an end surface on the opposite side of the support from said ends which is curved on an arc about the axis of the support when the friction device is applied, and an applying device engaging said curved end surface.

22. A retarding mechanism comprising, in combination, a friction device having adjacent ends, a support of circular outline, a wedge device engaging said ends and having an elongated opening embracing the support and formed with an end surface on the opposite side of the support from said ends which is curved on an arc about the axis of the support when the friction device is applied, and a cam engaging said curved end surface.

23. A friction brake mechanism including, in combination, a friction device having adjacent ends, a support of circular outline, a device having a double wedge surface extending between said ends and having an elongated opening embracing the support and formed with an end surface on the opposite side of the support from said ends which is curved on an arc about the axis of the support when the friction device is applied, and an applying device engaging said curved end surface.

24. A friction brake mechanism comprising, in combination, a drum having a peripheral braking flange, two friction devices at least one of which is housed within the drum and which one is engageable with said flange, the other being angularly movable, means for forcing said other device against a zone of the braking flange at one side of the zone engaged by the first device, and power-multiplying means operated by movement of the angularly-movable device for applying the other device.

25. A friction brake mechanism comprising, in combination, a drum having a peripheral braking flange, two friction devices housed within the drum and which are engageable with different zones of said flange and one of which is angularly movable, and power-multiplying means operated by movement of the angularly-movable device for forcing the other device against the inside of said flange.

26. A brake comprising, in combination, a rotatable drum having a head and a cylindrical braking flange, friction means engageable with the cylindrical braking flange, and a servo friction device arranged on the opposite side of the friction means from the head of the brake drum and which is arranged to engage the drum and to turn with the drum through a small angle and to apply the friction means to the drum when so turning.

27. A brake comprising, in combination, a rotatable drum having a head and a cylindrical braking flange, friction means engageable with a zone of the cylindrical braking flange adjacent the head of the drum, a servo friction device arranged for engagement with a part of the drum on the opposite side of the friction means from the head of the drum, means for bringing the friction device into engagement with the drum in a manner permitting it to turn for a short distance with the drum, and means operated by the turning of the servo device for forcing the friction means against the drum.

28. A brake comprising, in combination, a rotatable drum having a head and a cylindrical braking flange, friction means engageable with a zone of the cylindrical braking flange adjacent the head of the drum, a servo friction device arranged for engagement with a part of the drum on the opposite side of the friction means from the head of the drum, means for bringing the friction device into engagement with the drum in a manner permitting it to turn for a short distance with the drum, and two power-multiplying devices on opposite sides of the drum operated by the turning of the servo device to force the friction means against the drum.

29. A brake comprising, in combination, a drum having a braking flange and which is open at one side and which has a head at its other side, an angularly-movable servo device engageable with a part of the drum immediately adjacent its open side, and which is mounted to permit it to turn a short distance with the drum, friction means engageable with the braking flange in a zone between said part of the drum and the head of the drum, and power-multiplying means operated by the turning of the servo device to force the friction means against said zone of the drum.

In testimony whereof, I have hereunto signed my name.

EUGENE PROSPER RENAUX.